(12) United States Patent
Aho et al.

(10) Patent No.: US 9,424,390 B2
(45) Date of Patent: Aug. 23, 2016

(54) COMPUTER AIDED MODELING

(71) Applicant: Tekla Corporation, Espoo (FI)

(72) Inventors: Marko Aho, Helsinki (FI); Teemu Heikkonen, Helsinki (FI); Tommi Nykopp, Helsinki (FI); Jukka Aro, Helsinki (FI); Jonic Bozo, Helsinki (FI); Ragnar Wessman, Espoo (FI); Erik Fallenius, Helsinki (FI); Jukka Suomi, Espoo (FI); Petteri Villa, Helsinki (FI); Minna Arola, Espoo (FI)

(73) Assignee: Tekla Corporation, Espoo (FI)

( * ) Notice: Subject to any disclaimer, the term of this patent is extended or adjusted under 35 U.S.C. 154(b) by 280 days.

(21) Appl. No.: 14/146,192

(22) Filed: Jan. 2, 2014

(65) Prior Publication Data

US 2014/0184595 A1 Jul. 3, 2014

(30) Foreign Application Priority Data

Jan. 2, 2013 (FI) .................................. 20135002 U

(51) Int. Cl.
*G06T 17/00* (2006.01)
*G06F 17/50* (2006.01)

(52) U.S. Cl.
CPC .......... *G06F 17/509* (2013.01); *G06F 2217/41* (2013.01)

(58) Field of Classification Search
None
See application file for complete search history.

(56) References Cited

U.S. PATENT DOCUMENTS 5,982,923 A * 11/1999 Kim ..................... G06K 9/4604
345/419
2011/0282632 A1* 11/2011 Rameau .................. G06T 17/10
703/1

OTHER PUBLICATIONS

Lockett et al., Graph-based feature recognition for injection moulding based on a mid-surface approach, 2005, Computer-Aided Design 37 pp. 251-262.*
Lockett, H. et al., "Graph-based Feature Recognition for Injection Moulding Based on a Mid-Surface Approach," Computer-Aided Design, vol. 37, Issue 2, pp. 252-262 (Feb. 2005); sections "3. Methodology" and "3.1 Moulding Features" on pp. 6-8, "3.4 Geometry Representation" on pp. 10-12 and "4.2 Feature Recognition" on p. 18.
The Search Report of the National Board of Patents and Registration of Finland for Application No. FI 20135002, mailed on Oct. 4, 2013, 1 page.

* cited by examiner

*Primary Examiner* — Kee M Tung
*Assistant Examiner* — Frank Chen
(74) *Attorney, Agent, or Firm* — Kilpatrick Townsend & Stockton LLP

(57) ABSTRACT

A simplified mechanism to generate, using data of a model, one or more pour units, a pour unit indicating one or more objects and/or one or more object parts that are intended to be manufacture by a pour, is provided. In the mechanism, a connectivity graph is created for one or more objects modeling a continuous cast product. Then it is checked whether or not the pour break splits the graph into two or more separate graphs. If it splits, two pour units are created on the basis of the two or more separate graphs.

19 Claims, 11 Drawing Sheets

COMPUTER AIDED MODELING

RELATED APPLICATION

This application claims priority to FI application no. 20135002 filed Jan. 2, 2013, which is assigned to the applicant of the present application and is hereby incorporated by reference in its entirety for all purposes.

FIELD

The present invention relates to computer aided modeling.

BACKGROUND ART

The development of data processing systems, computers and computer applications has transformed different processes into computerized processes.

One example of such a process is modeling. Modeling means that a model is created from a product under design for describing the product to be constructed, the model containing at least information needed to illustrate the product. A product may be composed of one or more articles. Computer applications typically apply predefined object types that are provided with values in connection with the modeling to create objects (models) of articles that exist or will exist (or at least are planned to exist) in the real world. Examples of these object types in the field of building modeling include beams, columns, plates and slabs. A product model may comprise in principle an unlimited amount of objects.

Casting is a manufacturing process by which a liquid material is usually poured into a mold, which contains a hollow cavity of the desired shape, and then allowed to solidify. Casting materials are usually metals heated to become liquid before casting or various cold setting materials, like epoxy, concrete, plaster and clay, that cure after mixing together two or more components forming the material. Typically a desired shape of a product manufactured by casting, i.e. a cast product, is modeled by one or more objects that may overlap with each other or be in touch with each other. It is rather common to manufacture the cast product by breaking the casting into two or more separate pours (casts). However, when the cast product is modeled, the modeler should have freedom to model without thinking whereto a break for the cast should be added, and the one planning pours should have freedom to form pours without thinking of object boundaries in the model.

SUMMARY

An object of the present invention is thus to provide a simplified mechanism to generate, using data of a model, one or more pour units, a pour unit indicating one or more objects and/or one or more object parts that are intended to be manufactured by a pour, wherein an object part is obtained from an object that is cut into at least two parts by a pour break added to a model. The object of the invention is achieved by a method, an apparatus and a computer program product which are characterized by what is stated in the independent claims. The preferred embodiments of the invention are disclosed in the dependent claims.

BRIEF DESCRIPTION OF THE DRAWINGS

In the following, different embodiments will be described in greater detail with reference to the attached drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any computer-aided modeling system, and corresponding modeling applications (i.e. modeling programs) including entity-based modeling systems and outline-based modeling systems.

In entity-based modeling systems physical properties of an article to be modeled are expressed as attributes, i.e. by using parameters. In other words, an object is given its creation point or points, such as a starting point and ending point of the object, the amount of creation points depending on the article to be modeled by the object, and values for different parameters representing the physical values of the article. This way the object is not tied to the physical properties of the article it depicts, but the geometry of the object can be created, when needed, by using the parameters. For example, a beam may be modeled in an entity-based modeling system by defining its starting point and ending point and providing values for different parameters representing the beams physical properties. The parameters of a beam, for example, may include location, material, type of cross-section and size. The parameters may even indicate the type of the object, which in the beam example is a beam. In outline-based modeling systems an object consists of edges and the form and size of the article are essential elements of the object. In an outline-based modeling system a beam, for example, is modeled by drawing each side of the beam and then combining the sides to form the beam, the profile of the beam being then modified by moving a necessary number of beam sides away from their original location.

Figure 1:
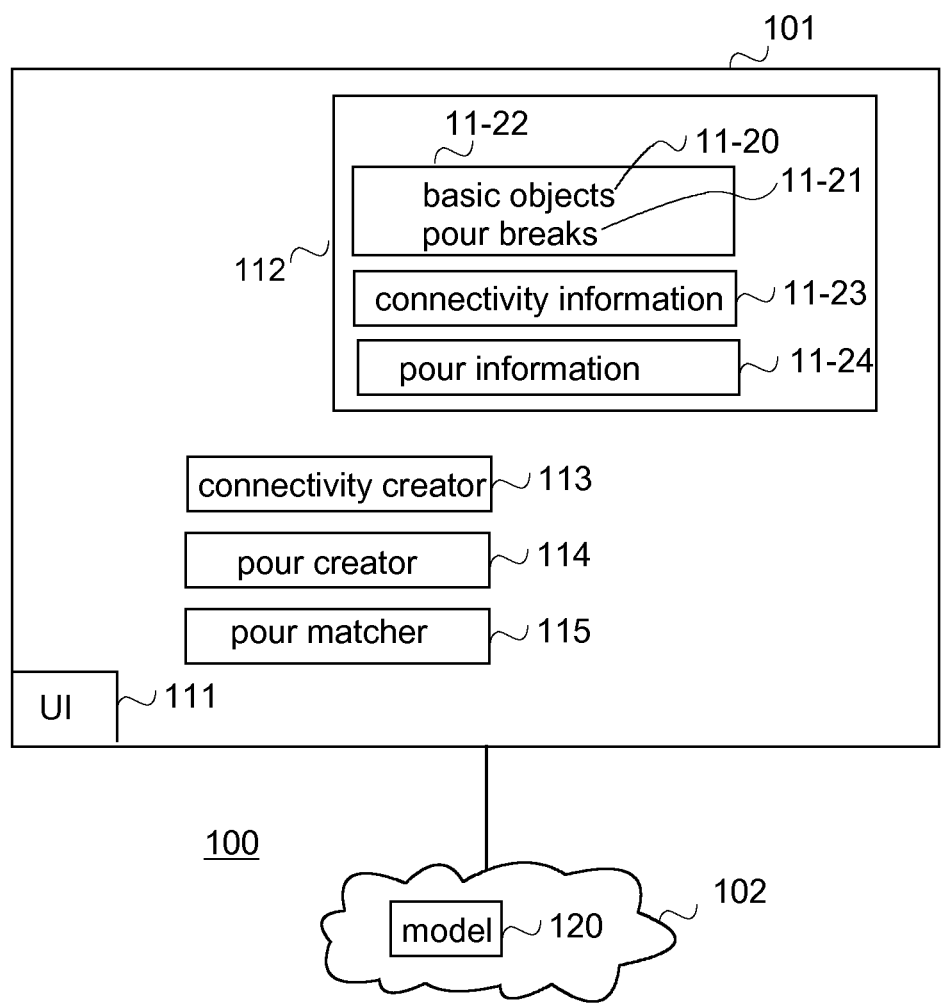
FIG. 1 shows simplified architecture of an exemplary system having schematic block diagrams of exemplary apparatuses.

FIG. 1 illustrates a simplified modeling system 100 comprising one or more apparatuses 101 (only one shown in FIG. 1) connected to a data storage 102 storing a model 120. It is obvious to a person skilled in the art that the system may also comprise other functions and structures that need not be described in greater detail here and that the data storage may be an integral part of the apparatus. Further, details of the disclosed structures and apparatuses that are not disclosed below, are irrelevant to the invention, and therefore they are not described in detail here.

The apparatus 101 is a computing device comprising not only prior art means, but also means for implementing functionality described with an embodiment/example and it may comprise separate means for each separate function, or means may be configured to perform two or more functions, and even to combine functions of different embodiments/examples. These means may be implemented by various techniques. For example, the means may be implemented in hardware (one or more apparatuses), firmware (one or more apparatuses), or software (one or more modules) components (recorded indelibly on a medium such as read-only-memory or embodied in hard-wired computer circuitry), or combinations thereof. For a firmware or software, implementation can be through units/modules (e.g., procedures, functions, and so on) that perform the functions described herein. The apparatus may generally include a processor (not shown in FIG. 1), controller, control unit, micro-controller, or the like connected to a memory and to various interfaces of the apparatus. Generally the processor is a central processing unit, but the processor may be an additional operation processor.

For implementing one or more of the below described functionalities, the apparatus 101 illustrated in FIG. 1 comprises a user interface 111, one or more memories 112 (only one shown in FIG. 1), a connectivity creator unit 113, a pour creator unit 114 and a pour matcher unit 115. It should be appreciated that the system may comprise one or more apparatuses having only the connectivity creator unit 113, and one or more apparatuses comprising the pour creator unit 114, or one or more apparatuses comprising the pour creator unit 114 and the pour matcher unit 115. Further, there may be one or more apparatuses comprising only the pour matcher unit 115 and one or more apparatuses comprising the connectivity creator unit 113 and the pour creator unit 114. Further, the system may be implemented without the pour matcher unit 114. The computing apparatus 101 may be any apparatus with which the model may be created and/or downloaded and/or edited and/or viewed and/or accessed and/or stored to the data storage 102, or otherwise handled/processed. Examples of apparatuses include a server, like a cloud server or a grid server, and a user terminal or a work station, such as a laptop, a smartphone, a personal computer, a tablet computer, a field device, an e-reading device, or a personal digital assistant (PDA).

The user interface 111 is the interface of the user, i.e. the person processing the model, to the modeling system. The user can create a model, modify a model, study it, output desired drawings and reports of the model, view the drawings, input information to the model, etc. by the means of the user interface 111.

The apparatus may generally include one or more volatile and/or non-volatile memories 112 that may be configured to store a working version (a working copy) of a model or part of the model the user has selected to process, for example as a "run-time database". Typically at least some data of the model are read from the data storage, and during processing the data constitute a "run-time database" in a central memory, for example, of the computing apparatus, where the data can be processed faster. When the processing ends the run-time data, or part of the run time data in the memory may be stored in the data storage.

In the illustrated example the "run-time database", i.e. the memory 112 comprises data of the model 11-22, connectivity information 11-23 and pour information 11-24. The creation/updating of some parts and examples of connectivity information 11-23 and/or pour information 11-24 are described in more detail below with FIGS. 2 to 16. Depending on an implementation, the connectivity information 11-23 and/or the pour information 11-24 or some of it/them may be cached (temporarily stored) for a certain period and at most as long as the run-time database is maintained, or stored permanently as part of the model 120 and read therefrom to the run-time database, or deleted after another modeled structure (a cast product) is selected, or deleted immediately after a new selection of the user is detected. Further, the connectivity information 11-23 or part of it may be maintained temporarily and/or stored permanently while the pour information 11-24 or part of it is created only when needed and not cached. An advantage provided by the use of a cache is that it increases performance by saving calculation resources and providing faster output. In implementations in which at least some of the pour information is stored permanently, the pour information for a pour unit may comprise additional information, like a material to be used or used, manufacturing date, surface finishing, curing, etc. An example of a material is a type of a concrete defining at least one of strength, workability, frost resistance, and hardening time, etc.

In the illustrated example, the data of the model 11-22 comprises definitions of basic objects 11-20 forming the model and information 11-21 on pour breaks, added to the model. A pour break represents a location in which a user (modeler) intends to break the continuous cast product. For example, concrete walls or slabs may have to be poured in sections for a variety of reasons: not enough concrete available for delivery; small finishing crew (cannot finish a larger pour); or the contents of the pour (rebar and mechanical) may be so intensive that only sections of it are done at a time. In other words, in the example it is assumed that such breaks have been added. Although not illustrated in FIG. 1, each basic object is associated with a unique object identifier and each break is associated with a unique break identifier. Examples of an identifier that may be used as an object identifier or a break identifier include a running number and a globally unique identifier (GUID). A GUID is a special type of identifier used in software applications to provide a unique reference number. However, it should be appreciated that any kind of an identifier may be used. It suffices that the identifier is unique within the model.

The term "object" used herein means an object representing an article that will or may exist in real world or at least is planned to exist in real world, and the term "basic object" means a separate object used by a modeler to create a more complex object comprising at least two basic objects. Typically, but not necessarily, the basic object has a geometric fundamental (basic) form, like a circle, a triangle, a square, a rectangle, a parallelogram, cube, a ball, a hemisphere, a cylinder, a cone, a prism, a parallelepiped and a pyramid. However, the basic object may be any arbitrary shaped solid boundary representation object. Further, it should be appreciated that the term "article" used herein means anything that will or may exist in real world or at least is planned to exist in real world and that may be modeled by a modeling application, covering one or more single pieces/articles, one or more parts, one or more assemblies including sub-assemblies, and one or more structures.

In the illustrated examples it is assumed that a pour break, also called herein a break, is an infinite plane, a finite plane or any type of a polygon or a chain of polygons with a finite surface that may have any shape.

The one or more memories 112 may also store other data, like a computer program code such as software applications (for example, for the connectivity creator unit 113 and/or for the pour creator unit 114 and/or for the pour matcher unit 115) or operating systems, information, data, content, or the like for the processor to perform steps associated with the operation of the apparatus in accordance with embodiments. A memory may be a random access memory, a read only memory, firmware, programmable logic, a double floating-gate field effect transistor, a hard drive, or other fixed data memory or storage device etc., and typically store content, data, or the like. Further, the memory, or part of it, may be removable memory detachably connected to the apparatus, or a cloud based memory attachable to the apparatus via a communication connection.

The apparatus 101 comprises the connectivity creator unit 113 and/or the pour creator unit 114 and/or for the pour matcher unit 115 for performing one or more functionalities from different embodiments described below. The connectivity creator unit 113 and/or the pour creator unit 114 and/or for the pour matcher unit 115 may be a separate unit or integrated to another unit or to each other in the apparatus. In another embodiment of the invention, the connectivity creator unit 113 and/or the pour creator unit 114 and/or for the pour matcher unit 115 may be divided into separate units. For example, the connectivity creator unit 113 may be divided into one unit for performing creating one or more connectivity graphs and one unit for updating the connectivity graphs in response to a change, and/or the pour creator unit may be divided into one unit for creating pour graphs and one unit for determining pour units, and/or the pour matcher unit 115 may be divided into one unit for filtering out changed pour units and one unit for matching changed pour units to previous pour units. The connectivity creator unit 113 and/or the pour creator unit 114 and/or for the pour matcher unit 115 may be configured as a computer or a processor, or a microprocessor, such as a single-chip computer element, or as a chipset, including at least a memory for providing storage area used for arithmetic operation and an operation processor for executing the arithmetic operation. The connectivity creator unit 113 and/or the pour creator unit 114 and/or for the pour matcher unit 115 may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed in such a way to carry out one or more functions of one or more embodiments. An embodiment provides a computer program embodied on any client-readable distribution/data storage medium or memory unit(s) or article(s) of manufacture, comprising program instructions executable by one or more processors/computers, which instructions, when loaded into an apparatus, constitute the connectivity creator unit 113 and/or the pour creator unit 114 and/or for the pour matcher unit 115. Programs, also called program products, including software routines, program snippets constituting "program libraries", applets and macros, can be stored in any medium, and may be downloaded into an apparatus. The data storage medium or the memory unit may be implemented within the processor/computer or external to the processor/computer, in which case it can be communicatively coupled to the processor/computer via various means as is known in the art. In other words, the connectivity creator unit 113 and/or the pour creator unit 114 and/or for the pour matcher unit 115 may be an element that comprises one or more arithmetic logic units, a number of special registers and control circuits.

Further, the apparatus may comprise other units used in or for modeling and for other purposes, such as an outputting unit (not illustrated in FIG. 1) for providing different outputs, like material lists or drawings, one or more receiving units and/or transmitting units (including a transmitter and/or a receiver or a corresponding means for receiving and/or transmitting information) so that a model may be retrieved and/or stored, and/or other user data, content, control information, signaling and/or messages can be received and/or transmitted. However, they are irrelevant to the actual invention and, therefore, they need not to be discussed in more detail here.

Although the apparatus has been depicted as one unity, different units and memory may be implemented in one or more physical or logical units.

In the illustrated example the modeling system comprises the apparatus as a terminal/client and the data storage 102 is a separate data repository or database comprising data 120 relating to a model. The data repository may be any kind of conventional or future data repository, including distributed and centralized storing of data, managed by any suitable management system. An example of a distributed storing includes a cloud based storage in a cloud environment (which may be a public cloud, a community cloud, a private cloud, or a hybrid cloud, for example). The implementation of the data repository and the way how the data is stored, retrieved and updated bears no significance to the invention, and need not to be described in detail here. Further, as said above, at the simplest, the data 120 relating to the model is stored to the apparatus.

Figure 2:
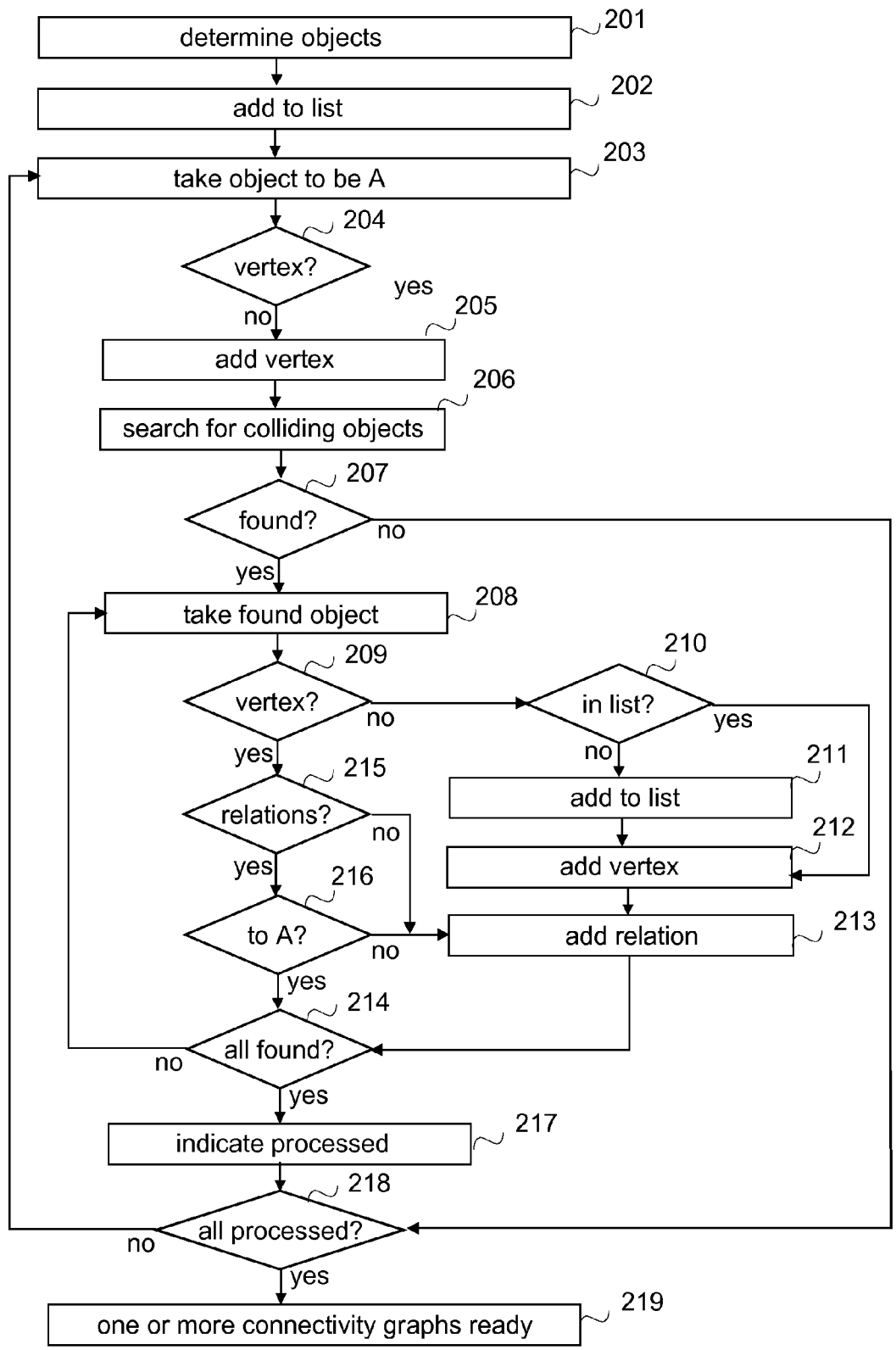
FIGS. 2 to 5 are flow charts illustrating different exemplary functionalities.

FIG. 2 is a flow chart illustrating an exemplary background run, i.e. an exemplary functionality of the connectivity creator unit, to create one or more connectivity graphs when a model or part of the model, is selected first time after the model with the basic objects is read into the run-time database. It should be appreciated that in other implementations the background run to create one or more connectivity graphs may be performed when the whole model is read into the run-time database, or when a part of the model is taken to be edited, or in response to detecting that the user starts to add breaks, or in response to detecting that the user has selected to create pour units.

Figure 9:
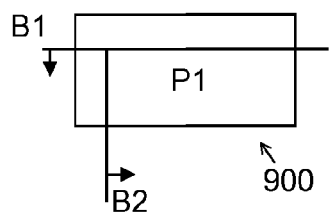
FIG. 9 illustrates a model for another exemplary cast product.

In the example of FIG. 2 it is assumed that connectivity graphs are created only to those basic objects of the model that belong to a continuous material piece to which the selected basic object belongs. A modeled cast product 600 in FIG. 6 and a modeled cast product 900 in FIG. 9 are examples of such a continuous material piece. As for a modeled cast product 1200 in FIG. 12, it comprises two separate continuous material pieces, one modeled by P4 and the other one modeled by a combination of P1, P2 and P3. Herein a modeled cast product means at least a part of a model that may represent in addition to the cast product other sub-products forming the product the model represents.

Referring to FIG. 2, in response to detecting that the user selected one or more objects, the object identifiers of the objects are determined in step 201 and added in step 202 to an object list. Using the model 600 for the cast product of FIG. 6 as an example, the user may have selected one or more of the objects 1 to 8 forming the modeled cast product 600, and after step 202 the object list contains objects, or object identifiers, 1 to 8.

Then an unprocessed object on the object list is taken in step 203 to be an object A that will be processed. In the example, it is first checked in step 204 whether or not the connectivity information already includes a corresponding vertex, and if not, a corresponding vertex is added in step 205 to the connectivity information and colliding objects are searched for in step 206. If the connectivity information already contains a corresponding vertex (step 204), the process continues directly to search for colliding objects. A corresponding vertex is a vertex having the same unique object identifier as the basic object has in the data of the model. Depending on settings, a colliding object may be one or more of the following: a basic object that intersects the object A, or overlaps the object A or touches the object A.

If one or more colliding objects are found (step 207), a found object is taken in step 208 and it is checked in step 209 whether or not the connectivity information already includes a corresponding vertex. If not, it is checked in step 210 whether or not the found object is on the object list. If not, the found object is added in step 211 to the object list, a corresponding vertex is added in step 212 to the connectivity information, and a relation (an edge) is created in step 213 between the vertex of the object A and the vertex of the found object. Then the process proceeds to check in step 214 whether or not all found objects are processed. If not, the process returns to step 208 and takes a found object.

If the found object is already on the object list (step 210), the process proceeds to step 212 to add the corresponding vertex to the connectivity information.

If the connectivity information already includes a corresponding vertex for the found object (step 209) it is checked in step 215 whether or not the vertex has any relations. If not, the process proceeds to step 213 to create a relation between the vertex of the object A and the vertex of the found object. If the vertex already has one or more relations (step 215), it is checked in step 216 whether or not a relation between the vertex of the object A and the vertex of the found object exists amongst the one or more relations. If not, the process proceeds to step 213 to create a relation between the vertex of the object A and the vertex of the found object. If the relation between the vertex of the object A and the vertex of the found object already exists (step 216), the process proceeds to step 214 to check whether or not all found objects are processed.

If all found objects are processed (step 214), the object that was processed as the object A is indicated in step 217 as a processed one on the object list, and then it is checked in step 218 whether or not all objects on the object list are indicated as processed ones. If not, the process proceed to step 203 to taken an unprocessed object to be the object A.

Figure 7:
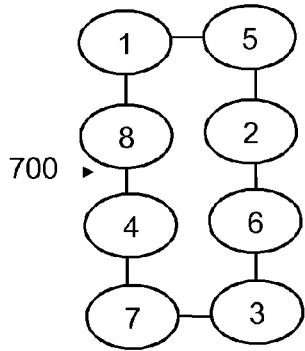
FIG. 7 illustrates an exemplary connectivity graph for the model of FIG. 6.

If all objects are processed (step 218), one or more connectivity graphs are (step 219) ready in the run-time database. In other words, the connectivity graph 700 of FIG. 7 is ready after it has been created vertex by vertex and relation by relation. In other words, a connectivity graph illustrates connections between solid boundary representation objects, a node in the connectivity graph representing one solid boundary representation object.

In FIGS. 7, 8A, 8B, 8D, and 8E vertices (nodes) are illustrated by flattened circles and relations by continuous lines between vertices.

Figure 3:
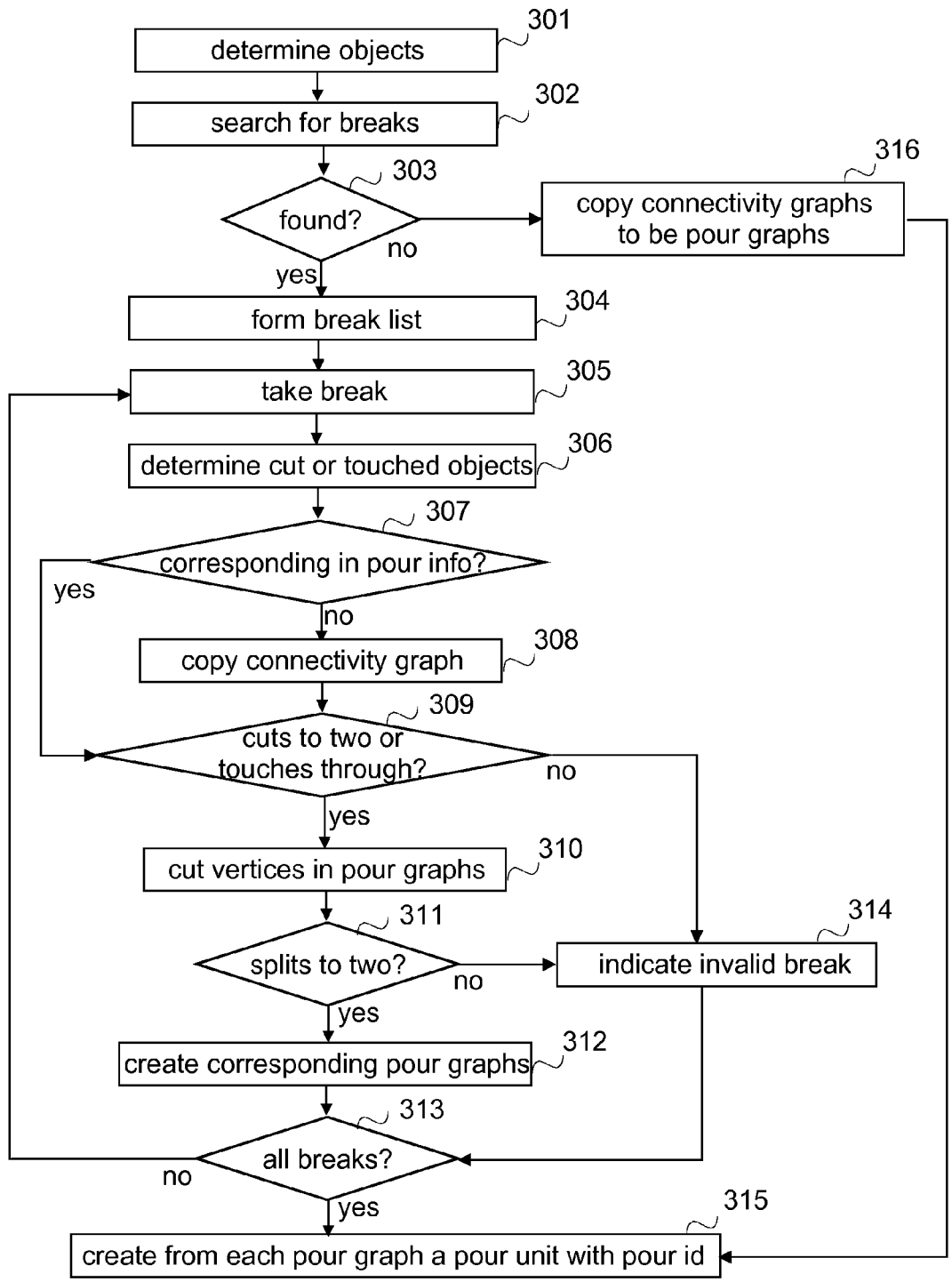

FIG. 3 is a flow chart illustrating an exemplary functionality to create pour units. More precisely, it describes an exemplary functionality of a pour creator unit. In the illustrated example it is assumed that corresponding one or more connectivity graphs are ready, breaks have been added in advance to the model and the user has selected to create pour units. In other words, in the illustrated example creating one or more pour units is delayed until they are needed. For example, for concrete structures, especially for cast-in-place concrete structures the pour units are needed only when one needs to know how much concrete one should order (or manufacture) but the structures themselves are designed in advance. It should be appreciated that the pour creator unit may be configured to create as a background run pour units when a break is added, or in response to reading in model comprising one or more break.

Figure 6:
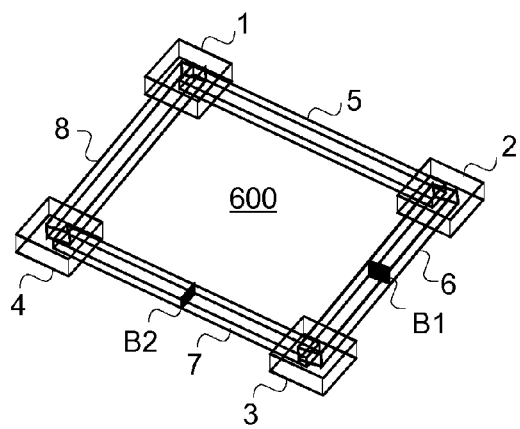
FIG. 6 illustrates a model for an exemplary cast product.
Figure 12:
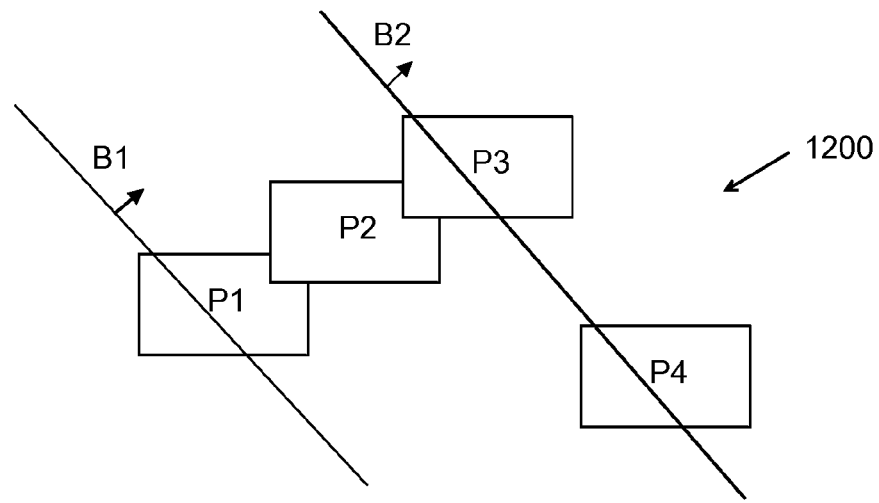
FIG. 12 illustrates a model for a further exemplary cast product.

Referring to FIG. 3, in response to detecting that the user selected one or more modeled cast products for which pour units are to be created, the object identifiers of the objects are determined in step 301 and breaks with corresponding break identifiers are searched for (or determined) in step 302. The breaks may be searched for by searching from the data of the model breaks cutting one or more of the determined objects or touching an end of one or more of the determined objects. A break that cuts an object is a break that intersects, or overlaps with at least one of the determined objects Examples of different breaks, denoted by B1 and B2, are illustrated in FIGS. 6, 9 and 12.

Figure 8A:
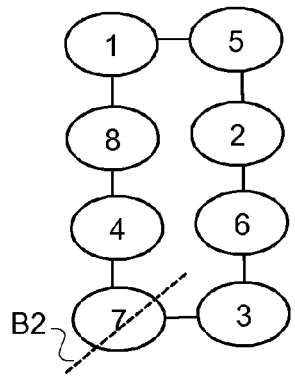
FIGS. 8A, 8B, 8D and 8E illustrate exemplary pour graph creation phases based on connectivity graph of FIG. 7.

If one or more breaks is found (step 303), each found break is added in step 304 to a break list. Then a break is taken in step 305 from the break list (and either indicated as a processed one or removed from the break list), and those objects that the break cuts or touches are determined in step 306. Then, in the example, it is checked in step 307 whether or not the pour information already contains a pour graph having a vertex with an identifier comprising an object identifier of one of the objects determined in step 306. If not, a corresponding connectivity graph is copied in step 308 to the pour information to be at least an initial pour graph. After the copying, or if the pour information already contained the pour graph (step 307), it is checked in step 309 whether or not the break cuts at least one of the objects to two separate sub-objects (smaller solids, like halves) or touches through the whole one end of at least one of the objects (i.e. goes along the end). For example, as illustrated in FIG. 8A, the break B2 (broken line) cuts the vertex relating to object 7 illustrated in FIG. 6 to two halves since the corresponding break B2 illustrated in FIG. 6 cuts the object 7. The same applies to all other breaks except for the break B2 in FIG. 9 if the break B2 is processed before the break B1, since the break B2 does not cut the object P1 in FIG. 9 to two halves. However, if the break B1 in FIG. 9 is processed before the break B2, the object P1 is divided to two parts (sub-objects) and the break B2 cuts one of the parts to two halves.

Figure 8B:
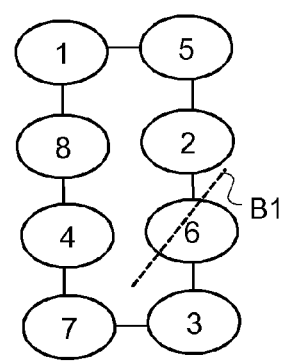

If the break cuts at least one of the objects to two separate sub-objects (step 309) or touches the whole one end of at least one of the objects (step 309), it is checked in step 310 whether or not the pour information already contains a pour graph having a vertex with an identifier comprising an object identifier of one of the objects cut two separate sub-objects or touched. If yes, the vertices that are in the pour graph and correspond to the cut objects are cut in step 310 into two halves, and relations in the pour graph corresponding to the touched ends are separated from corresponding vertices. Then it is checked in step 311 whether or not the pour graph is split to two separate graphs. For example, the break B1 in FIG. 6 does not split the pour graph to two separate graphs as can be seen in FIG. 8A, and the break B2 in FIG. 6 does not split the pour graph to two separate graphs, as can be seen in FIG. 8B, each break merely changes a closed circle graph to an open chain graph.

If the pour graph is split to two separate graphs (step 311), corresponding pour graphs are created in step 312 from the earlier pour graph which then ceases to exist and the process proceeds to check in step 313 whether or not all breaks are processed. If not, the process proceeds to step 305 to take another break.

In the illustrated example, if no object is cut to two separate sub-objects (step 309) or touches the whole one end of at least one of the objects (step 309) or if the pour graph is not split to two separate graphs (step 311), the break is indicated in step 314 as invalid, and then the process proceeds to step 313 to check whether or not all breaks are processed. An invalid break is an incomplete break that is omitted (ignored) when pour units are created. An advantage of detecting an invalid break and indicating it as an invalid break is that it enables to identify invalid breaks quickly and efficiently. A further advantage is that at a construction site an invalid break is preferably not shown, at least as a valid pour break, and hence no unnecessary pour stop is placed in a mold at the site.

Figure 8C:
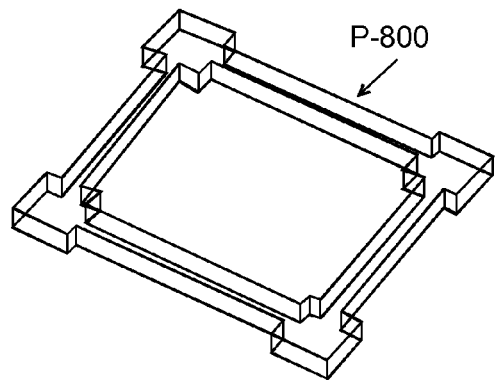
FIGS. 8C and 8F illustrate exemplary pours for the model of FIG. 6.
Figure 10:
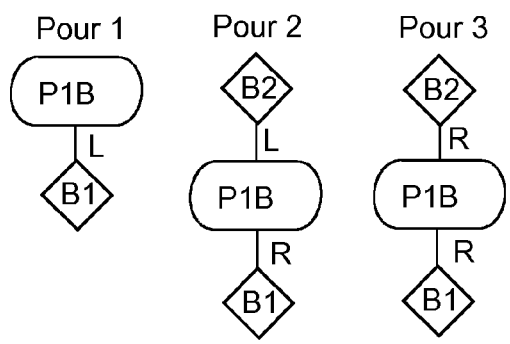
FIGS. 10 and 11 illustrate exemplary sets of pour units for the model of FIG. 9.
Figure 11:
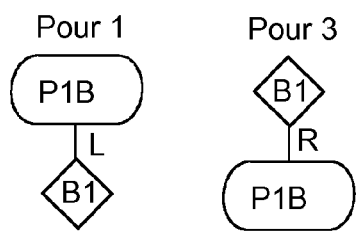
Figure 13:
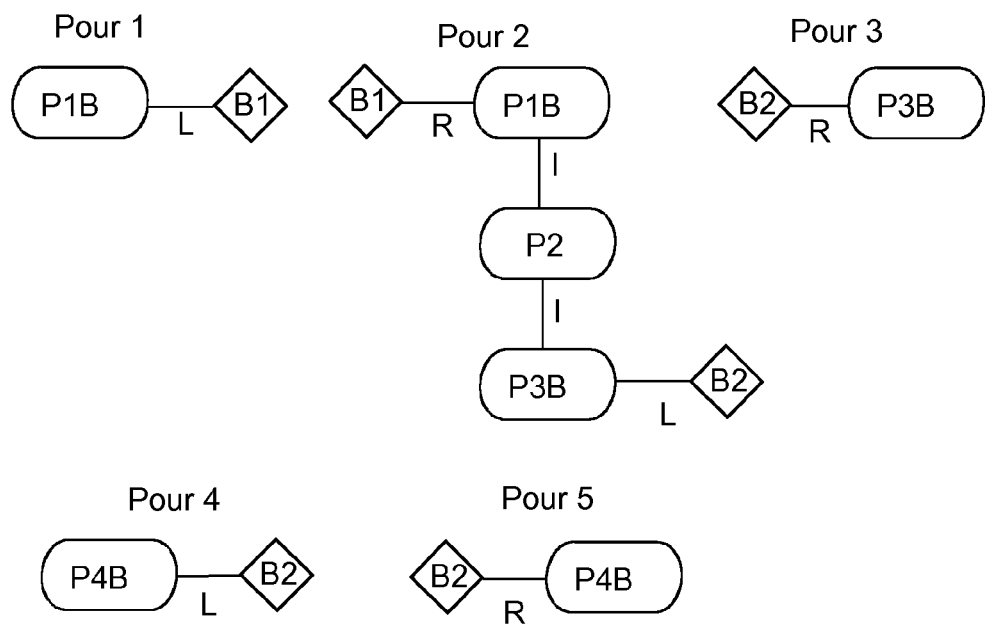
FIG. 13 illustrates exemplary pour units for the model of FIG. 12.

If all breaks are processed (step 313), from each pour graph a pour unit is created in step 315, each pour unit being associated with a unique pour identifier. For example, for the modeled cast product of FIG. 6, one pour graph is created, the pour graph corresponding to the connectivity graph of FIG. 7, and one pour unit, P-800 illustrated in FIG. 8C is created. The pour unit P-800 is a pour view, i.e. a three-dimensional illustration of a single cast. Depending on an implementation, the pour graph may be associated with the pour unit and the vertices indicate objects, or objects parts belonging or the information in vertices are associated with the corresponding part of the pour unit. FIG. 10 illustrates resulting three separate pour units Pour 1, Pour 2 and Pour 3 for the modeled cast product of FIG. 9, when the break B1 is processed first. FIG. 11 illustrates resulting two separate pour units Pour 1 and Pour 2 for the modeled cast product of FIG. 9, when the break B2 is processed first. FIG. 13 illustrates the resulting five pour units, Pour 1, Pour 2, Pour 3, Pour 4 and Pour 5 for the modeled cast products of FIG. 12. In FIGS. 10, 11 and 13, the diamonds indicate breaks, and the rounded rectangles are vertices and when an identifier in a vertex (i.e. associated with the vertex) ends with B, it indicates that the vertex represents only part of the object having an identifier corresponding to the identifier in vertex before B. Further, the L and R near the continuous lines depicting relations indicate whether the part of the object is the one to the left (denoted by L) or to the right (denoted by R) from the break. Further, the pours in FIG. 13 illustrate an exemplary implementation in which a relation, when added to a connectivity graph, is associated with information indicating whether the colliding objects intersect (denoted by I) or touch (denoted by T), and the information is copied to pour graph(s) and pour unit(s).

If no breaks are found (step 303), the one or more connectivity graphs created for the determined objects are copied in step 316 to the pour information to be corresponding pour graphs. Then the process proceeds to step 315 to create pour units.

Figure 4:
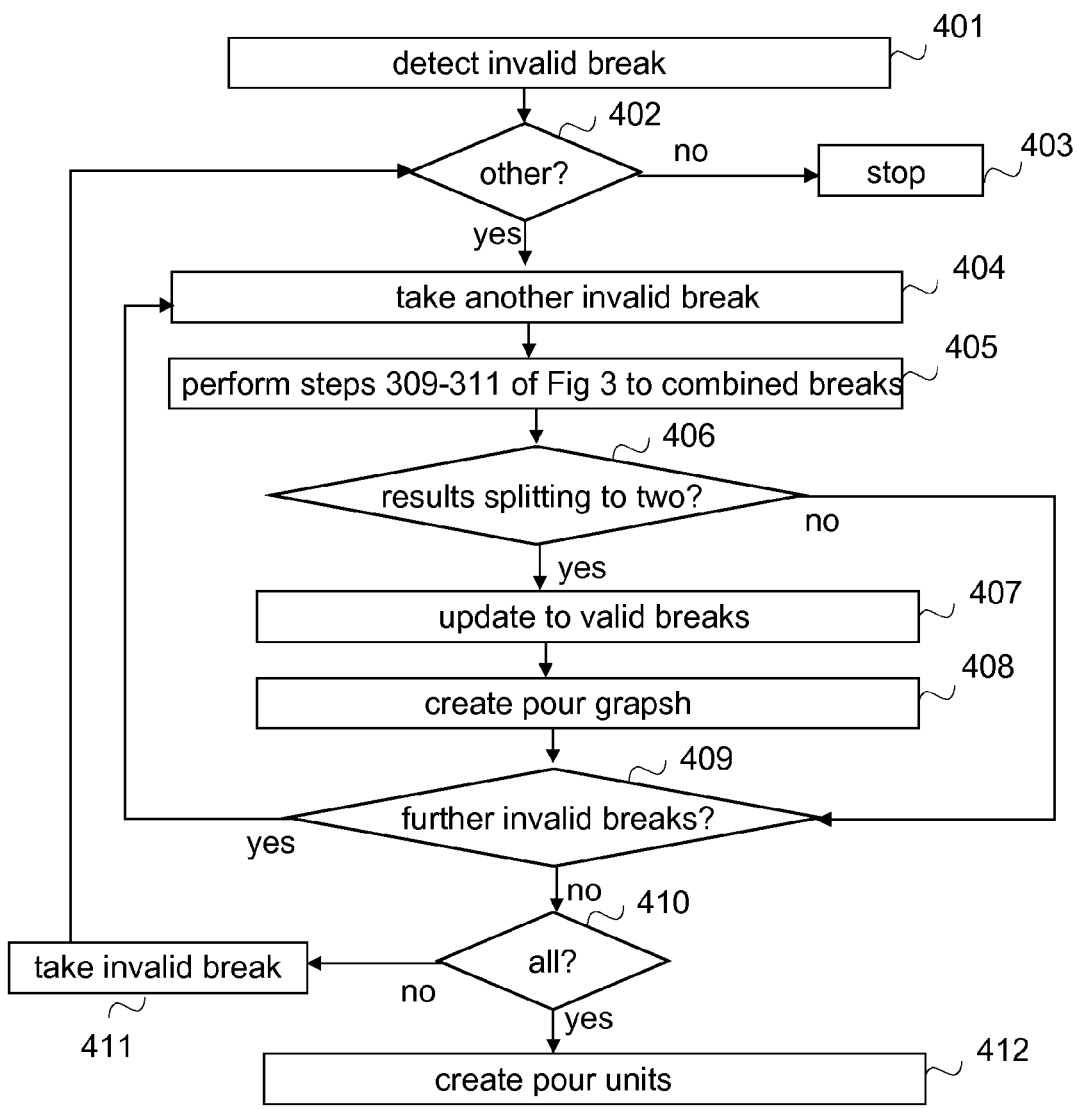
Figure 5:
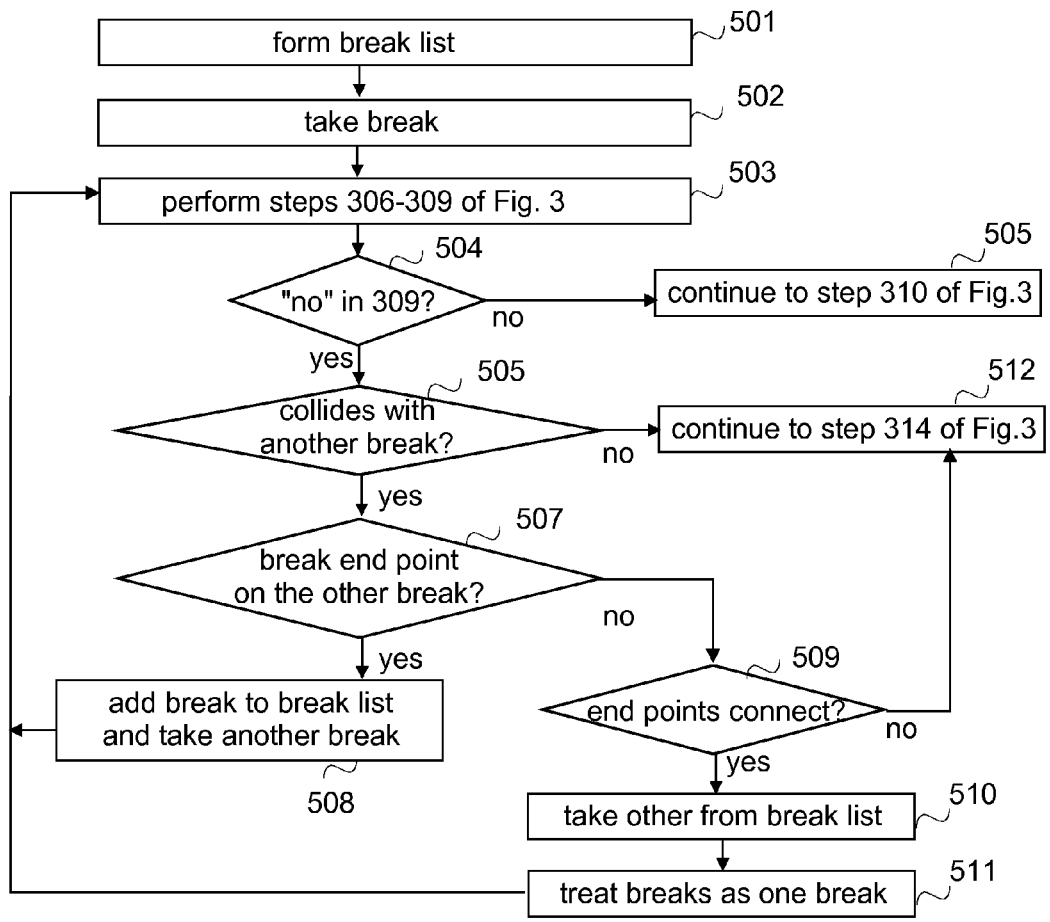

In the above example each break is treated as a separate break. Hence, even though the modeled cast product 600 in FIG. 6 comprises two breaks, a single pour unit is created, and the pour units for the modeled cast product 900 in FIG. 9 depends on which break is processed first. FIGS. 4 and 5 illustrate different exemplary functionalities which may be used to process the breaks so that the amount of invalid breaks is minimized, and the user adding the breaks may add them as seems logical to him/her.

In the exemplary functionality illustrated in FIG. 4, breaks indicated as invalid (step 314 in FIG. 3) are processed either simultaneously with the process described above with FIG. 3 or after all breaks are processed (i.e. after step 313 and before step 315 in FIG. 3). Below, a break indicated as invalid is called an invalid break. Depending on an implementation, a list of invalid breaks may be maintained or they may be indicated using some other means.

Referring to FIG. 4, when an invalid break is detected (step 401), it is checked in step 402 whether or not there are other invalid breaks. If not, in the illustrated example the processing is stopped in step 403. Alternatively, and if processed simultaneously with the process of FIG. 3 the process may monitor whether a new invalid break is detected and then return to step 402.

Figure 8D:
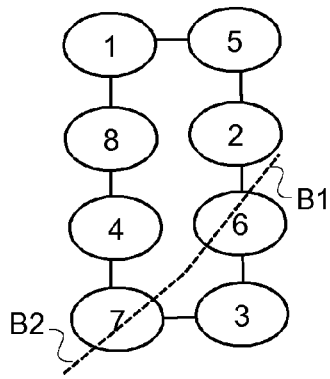
Figure 8E:
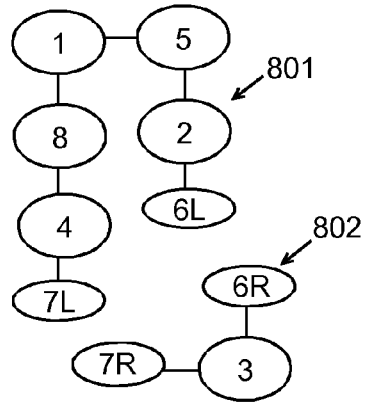

If there are one or more other invalid breaks (step 402), another invalid break is taken in step 404, and steps 309-312 of FIG. 3 are performed in step 405 using the two invalid breaks as if they were one break (a kind of combined break). If the end result is that the pour graph splits to two separate parts (step 406), the invalid breaks are updated in step 407 to be valid breaks. In other words, the indication is removed, and if invalid breaks are maintained on a list, the breaks are removed from the list. Then corresponding pour graphs are created in step 408 that corresponds to step 312 of FIG. 3. For example, if the breaks B1 and B2 of the modeled cast product 600 in FIG. 6 are processed together, as illustrated in FIG. 8D with the dashed lines touching each other, they split the initial pour graph into two separate pour graphs 801 and 802 illustrated in FIG. 8E.

Then it is checked in step 409 whether or not there are invalid breaks that have not yet been taken to be processed as another invalid break. If there are, the process proceeds to step 404 to take another invalid break.

If all other invalid breaks are processed as another break (step 409), it is checked in step 410 whether or not all invalid breaks are processed as the first break to which the other breaks may be combined. If not, an invalid break is taken to be processed in step 411 and the process proceeds to step 402 to check if there are other invalid breaks.

Figure 8F:
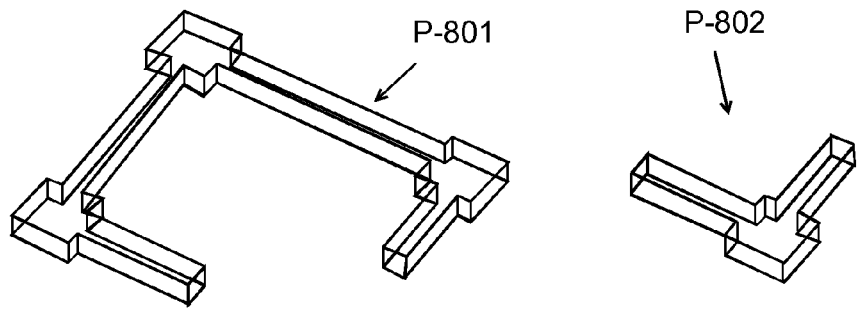

If all invalid breaks are processed as the first break (step 410), pour units are created in step 410 corresponding to step 315 of FIG. 3. For example, for the modeled cast product 600 in FIG. 6 pour units P-801 and P-802, illustrated in FIG. 8F, are created using the pour graphs 801 and 802 of FIG. 8E. It should be appreciated that if no pour graph has been created (i.e. the process has not proceed to step 408), no pour units are created.

In the exemplary functionality illustrated in FIG. 5, a processing order is defined for the breaks to ensure that the breaks are each time processed using the same order. The exemplary functionality is illustrated below as an extension to the process of FIG. 3, and therefore the steps refer to steps in FIG. 3. Further, the steps in FIG. 3 are not repeated here.

The process of FIG. 5 starts in step 501 which corresponds to step 304 of FIG. 3, i.e. in step 501 a break list is formed, and in step 502 a break is taken to be processed. Step 502 corresponds to step 305 of FIG. 3. Then steps 306-309 of FIG. 3 are processed in step 503, and in step 504 it is checked whether or not no object is cut to two separate sub-objects or the break touches the whole one end of at least one of the objects (i.e. "no" is received as an answer to the question of step 309). If no, i.e. the answer to the question of step 309 is "yes", the process continues (step 505) from step 310 of FIG. 3. If in step 504 the answer is no, i.e. no object is cut to two separate sub-objects or the break does not touch the whole one end of at least one of the objects, it is checked in step 506 whether or not the break collides with another break on the break list. If yes, it is checked in step 507 whether or not one of the break's end points is on the other break. If yes, the break taken in step 502 is added in step 508 back to the break list so that it will be processed later and the other break is taken from the break list to be processed and the process proceeds to step 503. For example, if the break B2 for the modeled cast product 900 of FIG. 9 is taken to be processed before the break B1, it is detected that P1 is not cut to two halves, and therefore the break B1 is found, the processing of the break B2 is interrupted, so that the break B1 is processed always before the break B2. That results always to pour units illustrated in FIG. 10.

If one of the break's end points is not on the other break (step 507), it is checked in step 509 whether or not the end points of the break connect to each other, i.e. are touching each other. If yes, the other break is taken in step 510 from the break list and in step 511 the breaks are determined to be treated during the processing as one break (however, without combining break identifiers), and the process proceeds to step 503. For example, if the breaks B1 and B2 illustrated in FIG. 6 are amended by extending them inside (i.e. in the opening formed by the chain of objects 1 to 8) so that they touch each other, they would be processed in the same way as described above with FIG. 4. However, if they are not extended, they are processed in the same way as described with FIG. 3.

If the break does not collide with another break (step 506) or if the end points do not combine (step 509) the process proceeds in step 512 to continue to step 314 of FIG. 3, i.e. the break is indicated as an invalid one.

In a further implementation, functionalities of FIGS. 4 and 5 are combined to minimize the amount of invalid breaks thereby adapting more easily to different modeling habits. For example, the user can add breaks by adding, instead of a complex polyline break, several small infinite planes to several objects that then as a whole result to the same pour units as the complex polyline break.

Above it was described that if an object is cut to two parts by a break, information is maintained on whether the part of the object is the one to the left (denoted by L) or to the right (denoted by R) from the break. It should be appreciated that use of left and right is a mere assistance tool, and any corresponding information may be used. Further, pour units and/or pour graphs may be created without such information.

In FIGS. 9 and 12 each break is associated with an arrow. The arrow is a further optional assisting tool indicating the direction to use when right and left are determined. The arrow may be determined by using creation information of a break, and it is preferably but not necessarily determined during the creation of the break. When a break is created (i.e. added to a model), a fixed point indicating whereto the break is intended has to be chosen first and then another point for the break needs to be selected. For example, a movement from the first chosen point towards the other point may be used to determine the left side and the right side of the break.

Figure 14:
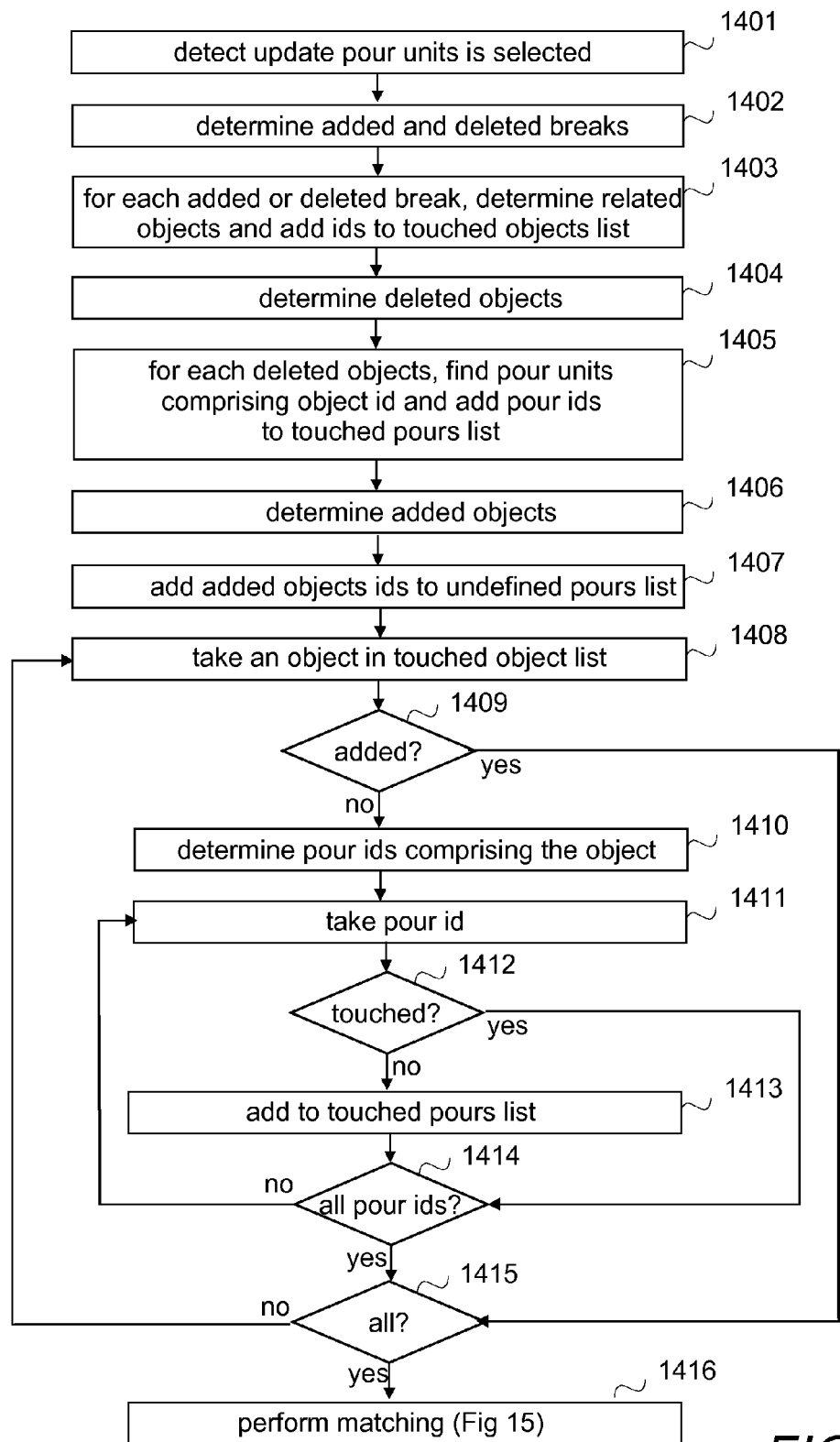
FIGS. 14 to 16 are flow charts illustrating different exemplary functionalities.
Figure 15:
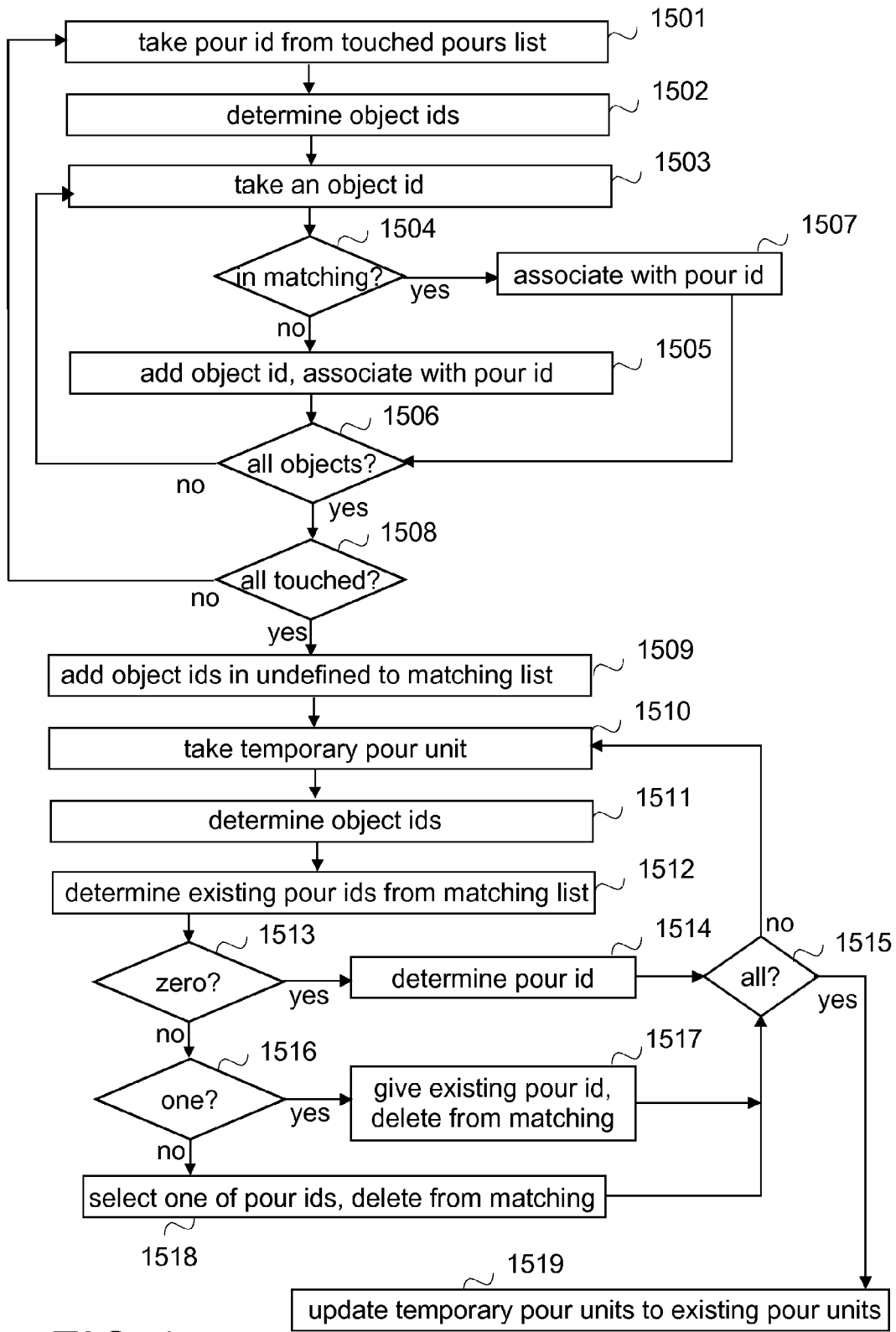
Figure 16:
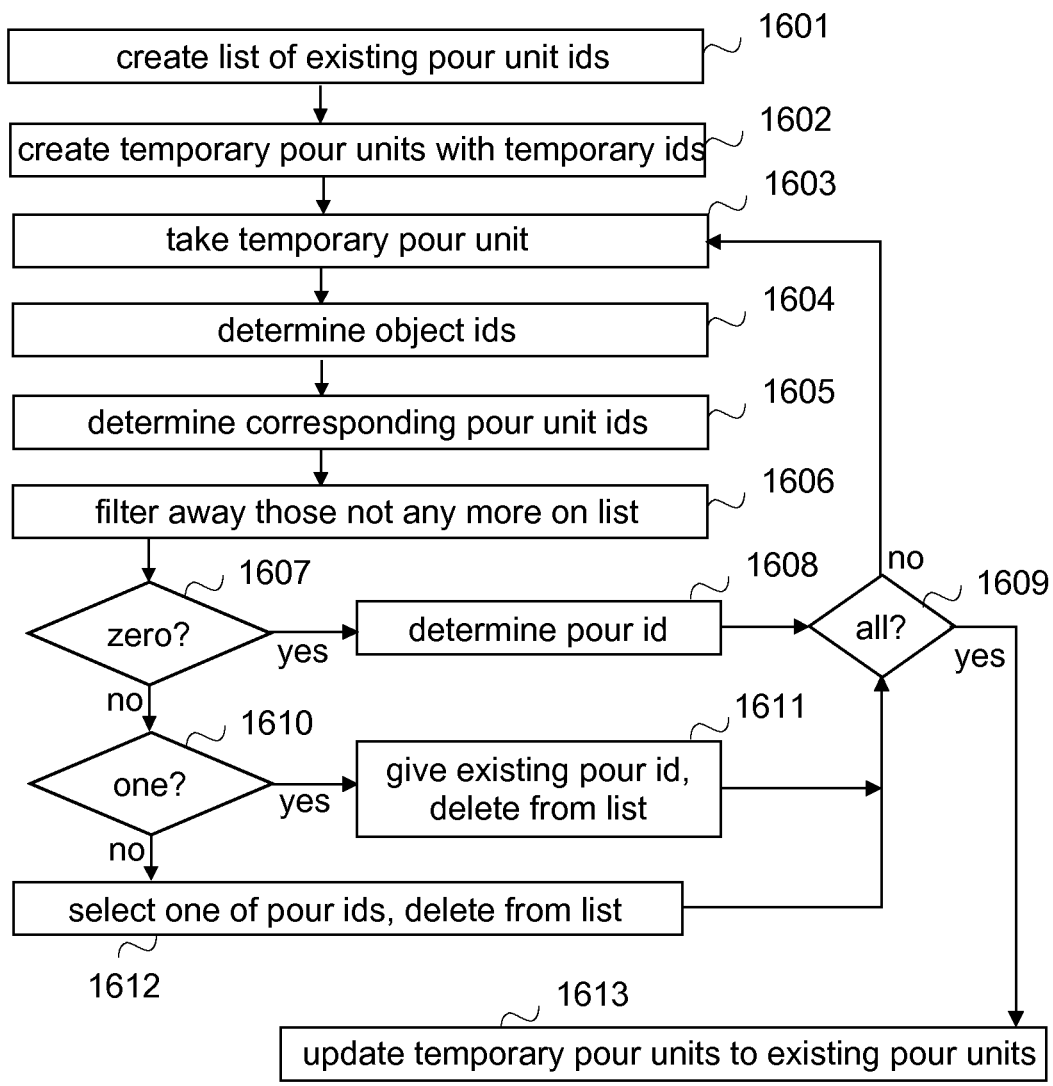

FIGS. 14 to 16 illustrate modeling in which pour information without relations from a pour unit to object(s) and break (s) forming the pour unit is permanently stored to be part of the model and in which unique pour identifiers are not reusable in the model even if the pour unit is deleted, without restricting the illustrated examples to such a modeling. For example, if the break B2 in FIG. 12 is amended, after the pour units are created, in such a way that it does not any more split object P4 into two parts, one of the pour units pour 4 and pour 5 (in FIG. 13) will be selected. The other pour unit is deleted but the pour identifier of the deleted pour unit will not be used in further pour units, not even in a pour unit created because later on the break B2 in FIG. 12 is re-amended to split object P4 into two parts. It should also be appreciated that in the modeling the actually geometry of the pour unit is not stored but the run-time information on the relations from object(s) and break(s) is used to obtain updated information with which the geometry is created. Below, it is assumed that when a pour unit is created, as described above, they are first provided with a temporary pour identifier that is selected amongst a pool of identifiers that are reusable, and then later on replaced by the unique pour identifier. However, it should be appreciated that a temporary pour identifier may always be a unique identifier, or that all identifiers may be reusable. Further, in the examples described with FIGS. 14 to 16 it is assumed, for the sake of clarity, that pour units are created from the updated model as a background but they are treated as temporary during the processing. In addition, it is assumed that an amendment of an object, such as changing a dimension of the object, location of the object and/or surface finishing of the object, is treated as a deletion of the original object and creation of a new object even if the same object identifier is used.

FIG. 14 is a flow chart illustrating an exemplary functionality of the matcher unit in an update situation in which an updated model has been already prior to the update initially processed, pour objects created, and pour information has been stored to the memory so that the pour information is usable after the modeling application is turned off and on, for example. For the sake of simplicity, below it is assumed that stored pour information for a pour comprises, in addition to the unique pour identifier and possible additional information, pour graphs (object identifiers of objects belonging to the pour unit and break identifiers of one or more breaks forming the pour unit), without restricting the solution to such an implementation. For example, if there are no valid breaks, no break identifiers are in the pour information. Examples of an update situation include that a user updates changes made to model to the pour units only occasionally (i.e. they are not updated constantly as a background run), or an engineer in a construction site receives an update from an architect. In order to update pour units instead of creating new pour units from scratch, the user selects to update pour units. In other words, the modeling application detects a need to update the pour units. It should be appreciated that the need to update may be detected without any specific user input, for example when the user closes the modeling application and stores the changes, if the application settings are set so. In the illustrated example it is assumed, for the sake of clarity, that the updated model is a compacted model, at least when it is processed. In a compacted model any event on a break preceding a delete event on the same break later in the update queue is erased, for example.

Referring to FIG. 14, when it is detected that update of pour units is selected (step 1401), deleted and added pour breaks are determined in step 1402 from the update information of the model. For each found added pour break and for each deleted pour break objects relating to the pour break in question are determined in step 1403 and corresponding object identifier(s) is (are) added to a touched objects list. An object relates to a pour break when it touches the pour break or collides with the pour break or overlaps the pour break.

After the breaks are processed, deleted objects are determined in step 1404. For each deleted object, one or more pour units comprising the deleted object's identifier are searched for amongst the existing pour units and found in step 1405, and a corresponding pour unit identifier is added in step 1405 to a touched pours list.

Next, added objects are determined in step 1406, and for each added object a corresponding object identifier is added in step 1407 to an undefined pours list.

Then the changes to the model have been determined, and the objects on the touched objects lists are processed by taking in step 1408 an object identifier from the touched objects list. First it is checked, in step 1409 whether or not the object is a new object, i.e. an object added to the model by comparing the touched object's identifier to the identifiers on the undefined pours list.

If the identifier is not found on the list, the object is not an added object, and from the existing pour units those pour units comprising the object identifier and corresponding pour identifiers are determined in step 1410. Then a pour identifier is taken in step 1411 and it is checked in step 1412 whether or not the pour identifier is already on the touched pours list. If it is not, the pour identifier is added in step 1413 to the touched pours list and the process proceeds to step 1414 to check whether or not all pour identifiers are processed. If not, the process proceeds to step 1411 to take a pour identifier.

If all pour identifiers are processed (step 1414), it is checked in step 1415 whether all objects on the touched object list have been processed. If not, the process proceeds to step 1408 to take an object identifier from the touched objects list.

If the pour identifier is already on the touched pours list (step 1412), the process proceeds to step 1414 to check whether or not all pour identifiers are processed.

If the object is an added object (step 1409), the process proceeds to step 1415 to check whether all objects on the touched object list have been processed.

If all objects on the touched object list have been processed (step 1416), the touched pour units and the objects in the unidentified pour list are matched in step 1416 with the existing pour units. The matching is performed to the pour units whose identifiers are in the touched pours list and to objects whose identifiers are in the undefined pour list according to preset rules, examples of which are given with FIG. 15.

When the matcher unit starts the process in FIG. 15, there exists the touched pours list comprising existing pour identifiers, and the undefined pour list comprising added objects' identifiers. It should be appreciated that during a matching process term "existing pour unit" is used to mean a valid pour unit which is during the update process a pour unit resulting from a previous pour unit update/create process. In the process a further list, called herein a matching list is used. The matching list associates an object identifier with one or more pour identifiers, if the object existed in the previous model.

In the illustrated example, the touched pours list is first processed by taking in step 1501 a pour identifier on the touched pours list, and then object identifier(s) of object(s) belonging to the pour unit (before the update) are determined in step 1502. Then it is checked in step 1504 whether or not the object identifier is already on the matching list. If not, the object identifier is added in step 1505 to the matching list and associated with the pour identifier. Then it is checked in step 1506 whether or not all object identifiers determined for the pour identifier are processed. If not, the process proceeds to step 1503 to take a next object identifier to be processed. If the object identifier already is on the matching list (step 1504), the object identifier is associated in step 1507 with the pour identifier. Hence, if an object is, or at least was before the update, split into two or more parts by one or more breaks, the matching list will indicate all pours.

If all object identifiers determined for the pour identifier are processed (step 1506), it is checked in step 1508 whether or not all pour identifiers on the touched pours list are processed. If not, the process proceeds to step 1501 to take another pour identifier to be processed. If yes (step 1508), the object identifiers on the undefined pour list are added in step 1509 to the matching list.

Then processing of temporary pour units begin. As said above, the temporary pour units are created as a background process. A temporary pour unit is taken in step 1510 to be processed, and object identifier(s) of object(s) belonging to the temporary pour unit are determined in step 1511. For each object identifier, existing pour identifiers associated with the object identifier on the matching list are determined in step 1512.

If no pour identifiers were found on the matching list (step 1513), the pour unit is either unchanged or a new one and a pour unit identifier is determined for the pour unit in step 1514. The determination comprises determining whether the pour unit is unchanged or new. In the illustrated example, the pour unit is unchanged if there exists in the existing pour units a pour unit comprising exactly the same object identifiers. If that is the case, the existing unique pour identifier is given to the temporary pour unit so that any information defined for the pour unit will be found. In an alternative embodiment, the existing pour unit may be associated with information indicating "no change" and the temporary pour unit will be deleted or associated with information indicating "do not update to existing". If the pour unit is a new pour unit, the temporary pour identifier is replaced with a unique pour identifier. Then the process proceeds to step 1515 to check whether or not all temporary pour units are processed. If not, the process proceeds to step 1510 to take another temporary pour unit to be processed.

If there are more than zero pour identifiers (step 1513), it is checked in step 1516 whether or not there is exactly one pour identifier. If there is exactly one pour identifier, it is given in step 1517 to the temporary pour unit and deleted in step 1517 from the matching list to ensure that it will not be used again for another temporary pour unit. Then the process proceeds to step 1515 to check whether or not all temporary pour units are processed.

If there are more than one pour identifier (step 1516), one of the pour identifiers is selected in step 1518 and deleted from the matching list. Then the process proceeds to step 1515 to check whether or not all temporary pour units are processed. A selection rule may be as follows:
1. if additional information is associated with one pour identifier, it is selected;
2. if additional information is associated with more than one pour identifier, the one having the newest version of additional information is selected (or the one having the biggest amount of additional information, or it may on the type of the additional information);
3. if no additional information is associated, selecting the pour identifier of the pour unit having the biggest amount of same object identifiers;
4. the oldest pour identifier.

It should be appreciated that there are no restrictions to a selection rule, and any selection criteria (or criterion) may be used. For example, the rule may be selecting the pour identifier of the pour unit having the biggest amount of same object identifiers, and if there are more than one of such pour identifiers, selecting the smallest one (if pour identifiers are numerical values).

If all temporary pour units are processed (step 1515), the temporary pour units (with the unique identifiers) are updated in step 1519 to be the existing pour units.

During the matching process pairs are formed, a pair comprising the most suitable existing pour unit for a temporary pour unit and the temporary pour unit. Further, for those temporary pour units to which a suitable counter-pair is not found, new pour information is generated.

FIG. 16 illustrates another example than the one illustrated in FIGS. 14 and 15. In the example of FIG. 16, a list comprising existing pour unit identifiers is created in step 1601 and in the meantime temporary pour units, each with a temporary identifier, are created in step 1602. A temporary pour unit is taken in step 1603 to be processed and object identifier(s) of object(s) belonging to the temporary pour unit are determined in step 1604. For each object identifier, existing pour identifiers are determined in step 1605, and those existing pour identifiers that are not on the list created in step 1601 are filtered away in step 1606.

If after filtering there are no existing pour identifiers (step 1607), a unique pour identifier is determined for the temporary pour unit, and the process proceeds to step 1609 to check whether or not all temporary pour units are processed.

If there are more than zero pour identifiers (step 1607), it is checked in step 1610 whether or not there is exactly one pour identifier. If there is exactly one pour identifier, it is given in step 1611 to the temporary pour unit and deleted in step 1611 from the list created in step 1601. Then the process proceeds to step 1609 to check whether or not all temporary pour units are processed.

If there are more than one pour identifier (step 1610), one of the pour identifiers is selected in step 1612 and deleted from the list created in step 1601. The selection may be based on any criteria, as described above with FIG. 15. Then the process proceeds to step 1609 to check whether or not all temporary pour units are processed.

If all temporary pour units are processed (step 1609), the temporary pour units (with the unique identifiers) are updated in step 1613 to be the existing pour units.

By means of the deleting (steps 1611, 1612) and filtering (step 1606) it is ensured that a unique pour identifier is used only once.

Although in the above break lists, object lists, for example, are used, different lists may be replaced by a corresponding hierarchy tree, or corresponding information maintained in another way. Further, if the model or the run-time database contains a hierarchy tree for the objects, the hierarchy tree may be utilized in forming the connectivity graphs.

An advantage provided by a connectivity graph and the pour graph(s) based in the connectivity graph is that complex graphical cases are managed by simple local operations to topological network thereby fastening the process, requiring less processing capability and providing faster response to a user input.

Although in the above terms "vertex", "relation" and "graph" have been used and illustrated also in Figures, it should be appreciated that no graphs may be shown to the user, and the internal structure used inside a computing apparatus for a corresponding information, including storing at least temporarily to a memory corresponding pieces of information and obtaining and processing them by a processor, the processing including mapping from graph(s) and vertice(s) either to input objects (parts and breaks) or output objects (pours), may be different than the disclosed graph structure, and there are no limitations to the internal structure used. It suffices that similar information is provided regardless the way the information is provided and processed.

The steps shown in FIGS. 2 to 5 and 14 to 16 are in no absolute chronological order, and some of the steps may be performed simultaneously or in an order different from the given one, and steps in one Figure may be performed simultaneously or overlapping with steps in another Figure. Other functions can also be executed between the steps or within the steps. For example, an invalid break may be provided a different color than a valid break, or an arrow pointing to the invalid break may be shown to a user. Some of the steps or part of the steps can also be left out. For example, pour units may be created directly from a connectivity graph. Another example is that an indication of invalid breaks, like step 314 in FIG. 3, may be skipped over. Yet another example includes a solution in which the pour information stored permanently comprises for each pour unit, in addition to the pour identifier at least one of the following: one or more geometric characteristics of a pour unit, such as a geometric center and cross-angle distances, volume and extrema (such as minimum dimensions or maximum dimensions), material to be used in casting, material grade and finishing. In the solution, during matching for each temporary pour distances to each existing pour are calculated, and using a greedy algorithm (or other suitable mathematical optimization algorithm) selects temporary pour unit—existing pour unit pairs in such a way that a pour unit in a pair cannot be used in another pair. That ensures that a unique pour identifier is used only once and remains unique.

The steps in different Figures can also be freely combined or divided into several parts.

It should be appreciated that the above described examples are implementable with any casting material to form a corresponding pour, like metals, epoxy, concrete, plaster, plastic, clay etc.

Although in the above term "pour unit" is used in a meaning of an outcome of a single pour (or an intended single pour), it should be appreciated that any other term having the same meaning, like a "pour object" or "pour piece" may be used. Further, it should be appreciated that in implementations in which assemblies of single pours are created and possibly stored, term "pour unit" may be used for the assembly in case another term, like "pour object" or "pour piece" is used for a single pour. Examples of an assembly or a pour assembly include pours performed during a certain time period, like a week), and pours performed to create certain structure(s), like columns in floor 1, outdoor walls, and pours performed instead of an intended single pour.

It will be obvious to a person skilled in the art that as technology advances, the inventive concept can be implemented in various ways. The invention and its embodiments are not limited to the examples described above but may vary within the scope of the claims.

What is claimed is:

1. A computerized method comprising:
    reading into a run-time database a model comprising at least one or more solid boundary representation objects modeling a continuous cast product;
    creating, by a computer application, a connectivity graph for one or more objects modeling a continuous cast product in a model, a node in the connectivity graph representing one solid boundary representation object;
    checking, by the computer application, whether or not a pour break added by a user via a user interface to a model splits the connectivity graph at least into two separate graphs, a pour break representing a location in which a user intends to break the continuous cast product;
    if yes, creating, by the computer application, at least two pour units on the basis of the at least two separate graphs, wherein a pour unit indicates amongst said one or more objects modeling a continuous cast product one or more objects and/or one or more object parts that are intended to be manufactured by a pour, wherein an object part is obtained from an object that is cut into at least two parts by the pour break; and
    creating for each pour unit a pour graph, the pour graph comprising at least one first node indicating a break, at least one second node indicating one of a one solid boundary representation object and a part of a solid boundary representation object cut by the pour break, and at least one line between two nodes, each line illustrating a relation between nodes, wherein the at least one first node and the at least one second node have different shapes, and in response to a second node indicating a part, the second node comprises an indicator indicating that it represents only the part, wherein the indicator further indicates which part of the object remains in the object part after cutting by the pour break.

2. A computerized method as claimed in claim 1, further comprising:
omitting the pour break if the break does not split the connectivity graph into two separate graphs; and
creating one pour unit on the basis the of one graph.

3. A computerized method as claimed in claim 1, wherein a pour unit is a graph indicating each object and object part that are in the graph on the basis of which the pour unit is created.

4. A computerized method as claimed in claim 1, wherein the connectivity graph has for each object a vertex, and if two or more objects are used to model the continuous cast product, vertices are connected by relations depicting the relation of the objects the vertices represent.

5. A computerized method as claimed in claim 1, wherein
a line between a first node and a second node is associated with information indicating whether the part or the object the second node indicates is the one to the left or the one to the right from the break; and
a line between two second nodes is associated with information indicating whether the part or the object collides or touches with the other part or the object.

6. A computerized method as claimed in claim 1, the method further comprising:
copying the connectivity graph to be an initial pour graph; and
using the initial pour graph instead of the connectivity graph.

7. A computerized method as claimed in claim 1, further comprising:
collecting each pour break that cuts at least one of the one or more objects or touches one end of at least one of the objects;
repeating the checking steps and creating steps for each collected pour break, using the result graphs of the previous pour breaks for the checking.

8. A computerized method as claimed in claim 1, further comprising:
processing first pour breaks cutting at least one of the one or more objects into two parts or touching the whole one end of at least one of the objects;
processing then pour breaks cutting at least one of the two parts into two parts or touching the whole one end of at least one of two parts; and
repeating the latter processing as long as there are unprocessed pour breaks.

9. A computerized method as claimed in claim 1, further comprising indicating a pour break that does not split a graph into two separate graphs to be an incomplete pour break.

10. A computerized method as claimed in claim 9, further comprising checking whether or not two or more pour breaks indicated as incomplete will together split a graph at least into two separate graphs, and
if yes, creating at least two pour units on the basis of the at least two separate graphs.

11. A computerized method as claimed in claim 1, wherein a pour unit is at least for one of the following group comprising concrete pouring, metal pouring, epoxy pouring, plaster pouring, plastic pouring and clay pouring.

12. A computerized method as claimed in claim 1, further comprising:
providing each pour unit amongst existing one or more pour units with pour information comprising at least a unique pour identifier associated with information indicating at least the pour break and the one or more objects;
detecting a need to update pour units;
creating one or more temporary pour units from newest model information in the run-time memory;
comparing the existing one or more pour units with the temporary pour units;
for each pair of an existing pour unit and a temporary pour unit being the same, using the pour information associated with the existing pour unit;
for each remaining temporary pour unit that does not form a part of a pair, using one or more predefined rules to determine whether or not a remaining existing pour unit whose pour information is not yet used for a temporary pour unit matches enough with the temporary pour unit, if such an existing pour unit is found, using the pour information associated with the existing pour unit for the temporary pour unit, and if such an existing pour unit is not found, assigning at least a unique pour identifier for the temporary pour unit and associating the temporary pour unit with pour information comprising at least the unique pour identifier; and
in response to each temporary pour unit being associated with pour information, updating the temporary pour units to existing pour units.

13. A computerized method as claimed in claim 12, wherein the predefined rule defines that an existing pour unit having the biggest amount of same object identifiers as the temporary pour unit matches enough with the temporary pour unit.

14. A computerized method comprising:
reading in data comprising pour information for a model comprising at least one or more solid boundary representation objects modeling a continuous cast product, the pour information comprising one or more unique pour identifiers, each pour identifier being associated with information indicating at least one or more objects amongst the one or more objects modeling the continuous cast product;
in response to a change to the model performing, by a computer application, the following:
creating one or more temporary pour units, each temporary pour unit indicating one or more objects modeling the continuous cast product in the changed model;
comparing existing one or more pour units deduced from the pour information or created during the reading in, with the temporary pour units, each existing pour unit indicating at least one or more objects associated with the pour identifier in the pour information;
for each pair of an existing pour unit and a temporary pour unit being the same, using the pour information associated with the existing pour unit;
for each remaining temporary pour unit that does not form a part of a pair, using one or more predefined rules to determine whether or not a remaining existing pour unit whose pour information is not yet used for a temporary pour unit matches enough with the temporary pour unit, if such an existing pour unit is found, using the pour information associated with the existing pour unit for the temporary pour unit, and if such an existing pour unit is not found, assigning at least a unique pour identifier for the temporary pour unit and associating the temporary pour unit with pour information comprising at least the unique pour identifier; and in response to each temporary pour unit being associated with pour information, updating the temporary pour units to existing pour units.

15. A computerized method as claimed in claim 14, wherein the creating one or more temporary pour units comprises:
   creating a connectivity graph for the one or more objects modeling a continuous cast product in the changed model;
   checking, whether or not one or more pour breaks split the connectivity graph at least into two separate graphs;
   if yes, creating at least two temporary pour units on the basis of the at least two separate graphs, each temporary pour unit indicating one or more objects modeling the continuous cast product in the changed model; and
   if not, creating one temporary pour unit, the temporary pour unit indicating the one or more objects modeling the continuous cast product in the changed model.

16. An apparatus comprising
   at least one processor; and
   at least one memory including computer program code;
   the at least one memory and the computer program code are configured to, with the at least one processor cause the apparatus at least to:
   create a connectivity graph for one or more objects modeling a continuous cast product in a model;
   check whether or not a pour break added to a model splits the connectivity graph at least into two separate graphs,
   create, in response to the pour break splitting the connectivity graph at least into two separate graphs, at least two pour units on the basis of the at least two separate graphs, and
   create for each pour unit a pour graph, the pour graph comprising at least one first node indicating a break, at least one second node indicating one of a one solid boundary representation object and a part of a solid boundary representation object cut by the pour break, and at least one line between two nodes, each line illustrating a relation between nodes, wherein the at least one first node and the at least one second node have different shapes, and in response to a second node indicating a part, the second node comprises an indicator indicating that it represents only the part, wherein the indicator further indicates which part of the object remains after cutting by the pour break.

17. A non-transitory computer readable medium comprising program code which, when run on a computing apparatus, will cause the computing apparatus to:
   create a connectivity graph for one or more objects modeling a continuous cast product in a model;
   check whether or not a pour break added to a model splits the connectivity graph at least into two separate graphs,
   create, in response to the pour break splitting the connectivity graph at least into two separate graphs, at least two pour units on the basis of the at least two separate graphs, and
   create for each pour unit a pour graph, the pour graph comprising at least one first node indicating a break, at least one second node indicating one of a one solid boundary representation object and a part of a solid boundary representation object cut by the pour break, and at least one line between two nodes, each line illustrating a relation between nodes, wherein the at least one first node and the at least one second node have different shapes, and in response to a second node indicating a part, the second node comprises an indicator indicating that it represents only the part, wherein the indicator further indicates which part of the object remains after cutting by the pour break.

18. A non-transitory computer readable medium as claimed in claim 17, the program code, when run on a computing apparatus, will further cause the computing apparatus to, further comprising:
   omit the pour break if the break does not split the connectivity graph into two separate graphs; and
   create one pour unit on the basis the of one graph.

19. A non-transitory computer readable medium as claimed in claim 17, wherein the program code is for computer aided modeling application.

* * * * *